United States Patent [19]

Wilcox, Jr.

[11] Patent Number: 4,669,926

[45] Date of Patent: Jun. 2, 1987

[54] DRILL GUIDE APPARATUS AND METHOD

[76] Inventor: Robert D. Wilcox, Jr., 1225 Ponderosa Plaza La., Prescott, Ariz. 86301

[21] Appl. No.: 820,030

[22] Filed: Jan. 21, 1986

[51] Int. Cl.4 .......................................... B23B 49/00
[52] U.S. Cl. .................................... 408/1 R; 33/666; 269/87.3; 408/72 B; 408/107; 408/115 R
[58] Field of Search ................. 408/97, 103, 104, 105, 408/107, 115 R, 115 B; 269/87.3, 155; 33/181, 189

[56] References Cited

U.S. PATENT DOCUMENTS

| | | | |
|---|---|---|---|
| 668,695 | 2/1901 | Stevens | 408/115 R X |
| 1,017,846 | 2/1912 | Budlong | 408/115 R X |
| 1,624,031 | 4/1927 | Adler | 33/189 X |
| 2,376,601 | 5/1945 | Kiesel | 33/189 |
| 2,602,238 | 7/1952 | Wellman | 408/105 X |
| 4,330,228 | 5/1982 | Beyl | 408/115 R X |

Primary Examiner—Z. R. Bilinsky
Attorney, Agent, or Firm—Harry M. Weiss & Associates

[57] ABSTRACT

A drill guide apparatus and method for its use is disclosed. The apparatus includes, in one embodiment, first and second vise jaws for clamping a workpiece. The vise jaws are adapted to receive a drill guide holder which includes first and second elongate members which properly position the drill guide itself. One end of each of the elongate members is attached to each of the vise jaws by pins which pass through the member and into a hole in the top of the vise jaw. The opposite ends of the elongate members are positioned above the space between the vise jaws and are hinged together by a ferrule which passes through the two members. A cylndrical drill guide which has a hole therethrough adapted in size to accept a particular size drill bit is fitted into the ferrule. The drill guide is thus located in a central position between the vise jaws above the workpiece which is clamped by the jaws. As the vise jaws are opened or closed to accommodate different size workpieces, the drill guide positioned at the vertex of the hinged elongate members remains centered above the space between the jaws.

20 Claims, 4 Drawing Figures

DRILL GUIDE APPARATUS AND METHOD

BACKGROUND OF THE INVENTION

This invention relates generally to a drill guide apparatus and its use, and more specifically to a drill guide apparatus which clamps a workpiece and centers the drill guide above the workpiece.

A machinist, cabinet maker, or other craftsman is often faced with a necessity for drilling a hole through the center of a workpiece such as a dowel, pipe, tube, or the like. The craftsman has the dual problem of holding the workpiece and properly guiding the drill bit to properly center the hole and to direct the angle of the hole in the workpiece.

It is an object of this invention to provide a drill guide apparatus which securely holds the workpiece and simultaneously positions the drill guide in a centered position over the workpiece to direct both the positioning and the angle of a drill bit.

It is another object of this invention to provide an improved method for holding a workpiece and drilling a centered hole therein.

BRIEF DESCRIPTION OF THE INVENTION

The foregoing and other objects and advantages of the invention are achieved through a drill guide apparatus and its use wherein the drill guide apparatus both clamps the workpiece and centers a drill guide over the workpiece. In one embodiment, the drill guide apparatus includes first and second opposing vise jaws for clamping a workpiece therebetween. First and second drill guide support members are hinged at a first end with the second ends of each position over and attached to each of the vise jaws. A drill guide is positioned at the vertex of the hinged members and allows a drill bit to be positioned to pass through a drill guide support member.

DETAILED DESCRIPTION OF THE PREFERRED EMBODIMENTS

Figure 1:
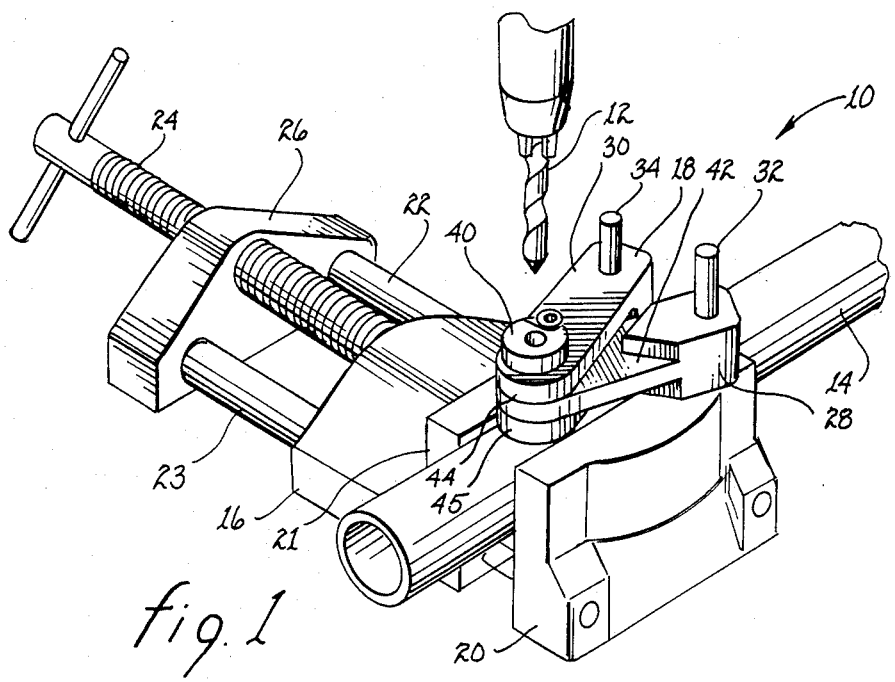
FIG. 1 illustrates, in perspective view, a drill guide apparatus in accordance with the invention.
Figure 2:
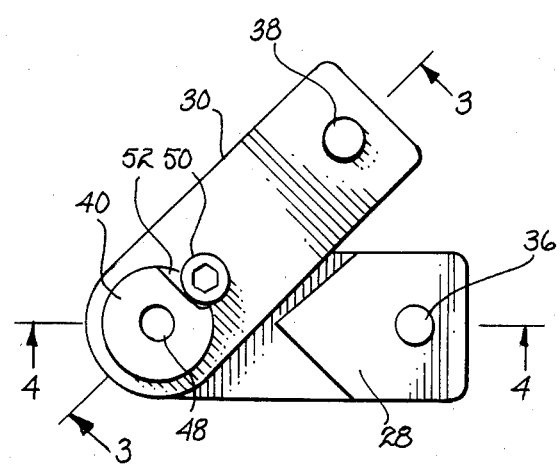
FIG. 2 illustrates, in top view, a portion of the drill guide apparatus.

FIG. 1 illustrates, in perspective view, a drill guide apparatus 10 being used to guide a drill bit 12 in drilling a hole in circular cylindrical workpiece 14. The drill guide apparatus includes a clamping apparatus, generally indicated by the number 16 and a drill guide support portion generally indicated by the number 18.

The clamping apparatus portion of the drill guide apparatus, in this preferred embodiment, includes first and second 20, 21 vise jaws for clamping a workpiece therebetween. Vise jaw 21 moves along parallel, cylindrical runners 22, 23 under the influence of a screw drive mechanism 24. The cylindrical runners extend from the first jaw vise 20 through the second jaw vise 21 to a spacer block 26. The vise shown in this embodiment is of the type generally used with a drill press, although the clamping apparatus could equally be a bench type vise.

The drill guide positioning mechanism 18 includes first and second elongate members 28, 30. Each of these elongate members has a first end which is secured to the top of one of the vise jaws by a pin 32, 34 which passes through a hole 36, 38, respectively, and into a mating hole in the top of the vise jaws. Pins 32, 34 are sized to fit snugly through the respective holes 36, 38, but allow rotation of the elongate members about the pins. The snug fit between the pins and the respective holes is needed to positively position the elongate members with respect to the vise jaws.

The opposite ends of the elongate members are hinged together with the vertex of the hinge centered above the opening between the two vise jaws. As the vise jaws are adjusted in spacing to accommodate various size workpieces, the hinged members 28, 30 rotate about the pins 32, 34, always maintaining the vertex of the hinge centered between the jaws. A drill guide 40 passes through the hinged end of the elongate members and is thus also maintained in a centered position between the jaws.

Figure 3:
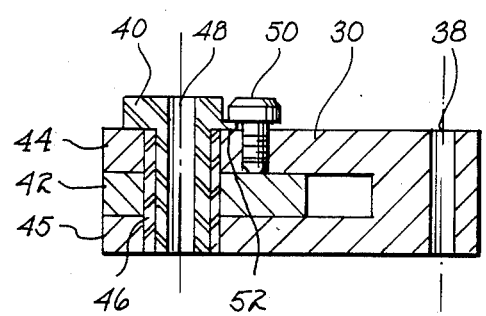
FIGS. 3 and 4 illustrate sectional views, as indicated, through the portion of the drill guide apparatus illustrated in FIG. 2.
Figure 4:
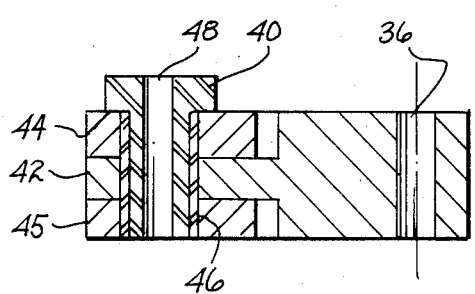

In this embodiment of the invention, elongate members 28, 30 are interleaved at the hinged end with member 28 having a single blade 42 positioned between the bifurcated ends 44, 45 of elongate member 30. A sleeve, ferrule, collet (FIGS. 3 and 4) 46 passes through the interleaved ends and serves as a hinge pin to join the two members. Drill guide 40, which is preferably a cylindrical member of hardened metal passes through the collet. The ends of elongate members 28, 30 through which the pins 32, 34 pass are a full thickness to provide additional stability to the drill guide apparatus.

Drill guide 40 can be made of hardened steel, carbon, steel, silicon carbide, or the like, to avoid excessive wear from a drill bit passing therethrough. The drill guide has a hole 48 passing through the center thereof to accommodate a particular size drill bit. The drill guide apparatus can be provided with a variety of drill guides, each having a different sized hole therethrough or accommodating different drill bit sizes. A particular drill guide is selected depending upon the size of the hole to be drilled. The drill guide fits into collet 46 and is held in place by a locking mechanism 50. The locking mechanism includes a lip 52 machined in the edge of the drill guide. A drill guide is placed in position in the collet 46 and rotated slightly to position collar 52; under the head of locking screw 50 is a set screw in member 30 and having its head positioned slightly above the top surface of member 30. Locking mechanism allows for easy interchangeability of the drill guides, but insures that a drill guide remains in position during a drilling operation. To use the drill guide apparatus, in accordance with the invention, a workpiece to be drilled is positioned therebetween the vise jaws. A drill guide having a hole adapted to accommodate the desired drill size is placed through collet 46 and locked into place by rotating the guide to bring collar 52 under locking screw 50. The free ends of elongate members 28 and 30 are secured to the top of the vise jaws by pins 32, 34. Positioning the free ends in this manner automatically positions drill guide 40 over the center of the opening between the vise jaws and thus over the center of the workpiece clamped therebetween. A drill bit is then passed through the drill guide to drill the desired hole in a workpiece. In a preferred embodiment, the clamping vise is positioned on a bed of a drill press to place the drill guide beneath the drill bit.

Thus it is apparent that there has been provided, in accordance with the invention, a drill guide apparatus and method which fully meets the objects and advantages set forth above. Although the invention has been described and illustrated with reference to specific embodiments thereof, it is not intended that the invention be limited to these illustrative embodiments. Those skilled in the art will recognize, after review of the foregoing detailed description, that variations and modifications are possible without departing from the spirit of the invention. Accordingly, it is intended to encompass within the invention all such variations and modifications as fall within the scope of the appended claims.

I claim:

1. Drill guide apparatus comprising:
   clamping means including first and second opposing means for clamping a workpiece therebetween;
   first and second guide support means, each having first and second ends;
   means for joining said first ends of said support means at a vertex;
   means for positioning said second ends of said first and second support means over said first and second opposing means, respectively; and
   drill guide means positioned at said vertex and allowing a drill bit to be positioned to pass through said first and second support means.

2. The drill guide apparatus of claim 1 wherein said clamping means comprises a vise and said first and second opposing means comprise jaws of said vise.

3. The drill guide apparatus of claim 1 wherein said first and second guide support means comprise first and second elongate members shaped to interleave at said first ends.

4. The drill guide apparatus of claim 3 wherein said means for joining comprises a hollow sleeve snugly fitted in a hole passing through the interleaved portion at said first ends.

5. The drill guide apparatus of claim 4 wherein said drill guide means is fitted in said hollow sleeve.

6. The drill guide apparatus of claim 5 wherein said drill guide means comprises a hardened metal insert having a hole therethrough sized to guide a drill bit.

7. The drill guide apparatus of claim 6 further comprising a plurality of interchangeable inserts each having a different sized hole to accommodate a different sized drill bit.

8. The drill guide apparatus of claim 6 further comprising means to removeably secure said insert in said sleeve.

9. The drill guide apparatus of claim 3 wherein said means for positioning comprises, in combination:
   a hole formed in the top of each of said first and second opposing means;
   mating holes formed through said second ends of each of said first and second elongate members; and
   first and second circular pins passing through said mating holes and into said holes formed in said tops, said pins securing said members to said tops and allowing rotation of said members thereabout.

10. Drill guide apparatus comprising:
    first and second clamping members for securing a workpiece therebetween;
    first and second hinged members each having a free end and a hinged end secured at said free ends to said first and second clamping pieces, respectively, and having said hinged ends joined at a location centered over a position between said clamping pieces;
    a collet passing through said hinged ends; and
    a drill guide member removeably positioned through said collet.

11. The drill guide apparatus of claim 10 wherein said clamping pieces comprise vise jaws.

12. The drill guide apparatus of claim 11 wherein said free ends are secured to said vise jaws by pins passing through said free ends and into holes formed in said vise jaws.

13. The drill guide apparatus of claim 10 wherein said hinged members are hinged on said collet.

14. The drill guide apparatus of claim 10 wherein said drill guide member comprises a hardened metal cylinder having a hole therethrough, said hole sized to accept a drill bit.

15. A method for guiding a drill bit, comprising the steps of:
    clamping a workpiece between first and second vise jaws;
    positioning a drill guide over said workpiece and centered between said vise jaws;
    said step of positioning comprises the step of providing first and second hinged members, each having a free end secured to one of said vise jaws and having a hinge positioned between said vise jaws, said hinge having a hole therethrough to accept said drill guide, said step of positioning further comprises the step of securing each of said first and second hinged members by passing at least one pin therethrough each of said free end; and thereafter passing a drill bit through said drill guide.

16. The method of claim 15 wherein said hinged members are secured to said vise jaws by pins passing through said members and into said vise jaws.

17. Drill guide apparatus comprising:
    first and second vise jaws for clamping a workpiece therebetween;
    first and second elongate members each having first and second ends attached to said first and second vise jaws, respectively, by pins passing through said first ends and into said vise jaws, said second ends positioned above the space between said vise jaws and being hinged together by a ferrule passing therethrough; and
    a cylindrical drill guide having a hole therethrough adapted in size for a drill bit, said guide positioned through said ferrule.

18. The drill guide apparatus of claim 17 wherein said drill guide is formed from a hardened metal.

19. The drill guide apparatus of claim 17 wherein said elongate members are interleaved at said second ends.

20. The drill guide apparatus of claim 17 further comprising locking means for securing said drill guide in said ferrule.

* * * * *